United States Patent [19]

Raynes

[11] Patent Number: 5,524,837
[45] Date of Patent: Jun. 11, 1996

[54] APPARATUS AND METHOD FOR PROCESSING GLASS CONTAINERS

[76] Inventor: John C. Raynes, P.O. Box 485, Keene, N.H. 03431

[21] Appl. No.: 126,931

[22] Filed: Aug. 3, 1994

Related U.S. Application Data

[63] Continuation-in-part of Ser. No. 772,681, Oct. 7, 1991, abandoned, which is a continuation-in-part of Ser. No. 626,756, Dec. 13, 1990, abandoned, which is a continuation-in-part of Ser. No. 592,588, Oct. 4, 1990, abandoned.

[51] Int. Cl.$^6$ .................................................. B02C 23/14
[52] U.S. Cl. .......................... 241/14; 241/24.15; 241/29; 241/76; 241/99; 241/152.2; 241/24.22; 241/24.3
[58] Field of Search ................................ 241/99, 76, 81, 241/34, 14, 230, 294, 236, 189.1, 195, 24, 29, 152.1, 152.2

[56] References Cited

U.S. PATENT DOCUMENTS

| | | | |
|---|---|---|---|
| 1,338,845 | 5/1920 | Schutz | 241/152.2 X |
| 3,151,814 | 10/1964 | Morgan et al. | |
| 3,504,621 | 4/1970 | Qualheim | 241/99 X |
| 3,587,984 | 6/1971 | Taylor et al. | |
| 3,655,138 | 4/1972 | Luscombe | 241/99 |
| 3,687,062 | 8/1972 | Frank | 241/99 X |
| 3,703,970 | 11/1972 | Benson | 241/99 X |
| 3,750,966 | 8/1973 | Anderson | |
| 4,069,979 | 1/1978 | Morita et al. | 241/99 X |
| 4,153,206 | 5/1979 | Haefner et al. | 241/14 |
| 4,795,103 | 1/1989 | Lech | 241/99 X |
| 4,867,384 | 9/1989 | Waltert | |
| 5,100,063 | 3/1992 | Bauer | 241/14 |

FOREIGN PATENT DOCUMENTS

| | | | |
|---|---|---|---|
| 3844263 | 2/1990 | Germany | 241/99 |
| 406055087 | 3/1994 | Japan | 241/99 |

Primary Examiner—Frances Han
Attorney, Agent, or Firm—Selitto & Associates

[57] ABSTRACT

The apparatus consists of a glass breaker alone or a glass granulator alone or combinations of the two machines along with a screen/sieve and cullet mover mechanism to sort or size the glass particles for further reprocessing or for use an end product of the glass processing apparatus. The glass breaker breaks the glass objects using a rotating shaft with breaker bars attached thereto. The glass containers are shattered by impact with radially extending members of a rotating shaft and by causing the glass to impact a breaker plate within a breaking chamber. The granulator is used to process glass cullet to create glass particles of selected size for the purpose of recycling. As a result of the granulation of the glass, it is possible to separate out or screen out the non-glass articles such as caps, rings, paper etc. Particularly, the granulator granulates the glass articles using at least one pair of synchronously counter-rotating rolls which, in the preferred embodiment, each has a plurality of granulating protrusions extending radially therefrom. The protrusions on each of the rolls, while the shafts are counter-rotating, interleave creating crushing or granulating zones wherein the glass objects, generally in the form of cullet, are crushed or comminuted. Particularly, the combination apparatus/machine first breaks up or shatters the glass articles in the glass breaker producing cullet. The cullet is sieved by the first sieving mechanism. That glass which is too large and the non-glass articles that do not sieve out are moved along and fed into the glass granulator. Glass particles may again be sieved by a second sieve/screen mechanism at the output of the granulator and non-glass articles are moved by the second sieving/moving mechanism to the output side of the sieve mechanism and off the end of the screen for disposal. Further, the instant glass processing apparatus, because of the very nature of the apparatus separates, but does not volumetrically reduce, non-glass articles thereby making the production of "clean" glass cullet (granules free of non-glass materials) a simple, much less expensive, and much more effective process, for the purpose of recycling.

20 Claims, 9 Drawing Sheets

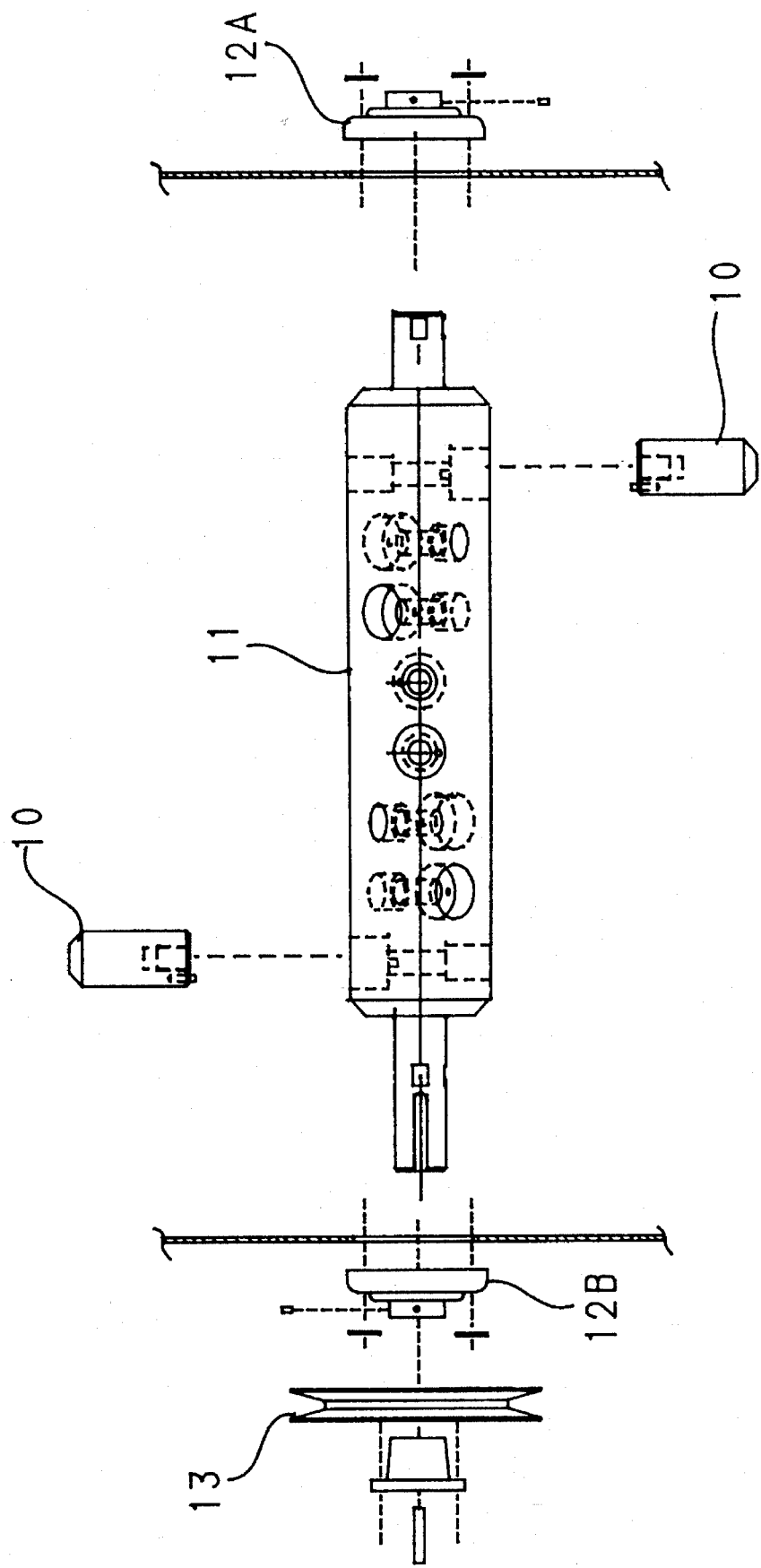

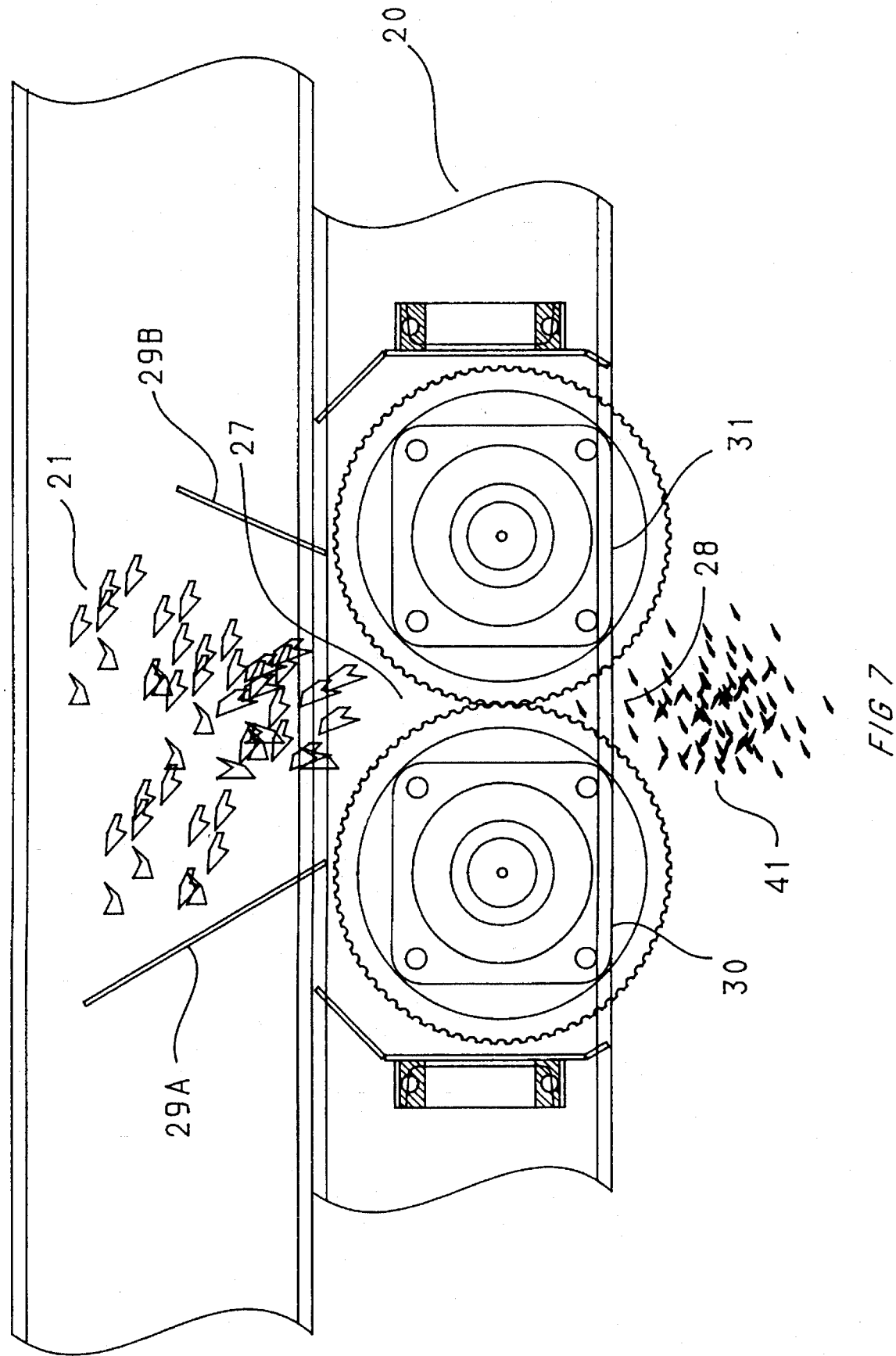

APPARATUS AND METHOD FOR PROCESSING GLASS CONTAINERS

BACKGROUND OF THE INVENTION

This application is a continuation-in-part of U.S. patent application Ser. No. 07/772,681 filed on Oct. 7, 1991 which is a continuation-in-part of U.S. patent application Ser. No. 07/626,756, filed on Dec. 13, 1990 which is a continuation-in-part of U.S. patent application Ser. No. 07/592,588, filed on Oct. 4, 1990, all abandoned.

FIELD OF INVENTION

This invention in its most simple form or embodiment most generally relates to a method and apparatus used to process container glass to remove non-glass articles such as, paper, lead foil, caps, rings, covers, lids, metal, plastic, aluminum and other non-glass articles, for the purpose of recycling. The specific method to remove these non-glass articles which are considered contaminants is as follows: The container glass is broken into pieces retaining the aforementioned non-glass articles or contaminants in the substantially whole condition. The resulting broken glass particles, referred to as cullet, are prescreened to remove the smaller particles of glass. The oversize glass cullet and contaminants that remain on top of the screen are fed into a mechanism to be squeezed to further reduce the particle size of the glass. The contaminants may be flattened but remain in the substantially whole condition. The glass cullet is now screened to remove the contaminants as the glass falls through the holes in the screen and the non-glass articles remain on top of the screen and are fed out of the apparatus for disposal.

The apparatus may consist of a glass breaker alone which shatters broken and whole glass bottles and jars into particles of glass or cullet. The apparatus may consist of a glass granulator alone which ideally takes the particles of glass produced by the glass breaker and squeezes it into smaller particles of glass of a certain maximum size. The maximum size of these glass particles may be predetermined by adjustments to the granulating machine and the cullet produced may be of a maximum size controlled by such an adjustment to the granulator. The apparatus may also consist of combinations of the first and third machines along with a means to sieve and feed the glass cullet for further processing or for use as an end product. Particularly, the combination apparatus first breaks up or shatters the glass in a glass breaker. The broken glass, referred to as cullet, is sieved by the first sieving mechanism to screen out the smaller particles of glass. Sieving at this point is accomplished by an oscillating or shaking screen and is the second phase of the process. The glass that falls through the holes in the screen is now free of caps, paper, rings, lead foil, covers, lids, and other non-glass articles. The oversize glass particles and non-glass articles that remain on top of the screen move forward from the shaking motion of the screen and are fed into the granulator. Glass cullet and non-glass articles go through the granulator and the glass is further downsized. Glass cullet from the granulator is sieved by a second screening and at this final stage the glass passes through the oscillating screen while the non-glass articles are fed off the end of the screen and out of the apparatus for disposal.

It is very important to note that because of the unique characteristics of both the glass breaker and the glass granulator the glass is broken and squeezed by the glass breaker and granulator to a predetermined maximum particle size that will pass through a screen with predetermined size holes. Neither the glass breaker nor the granulator substantially change the volumetric size of the non-glass articles which enter the apparatus thereby causing these non-glass articles to remain on top of the screen. Even when the non-glass articles pass through the glass breaker, are fed across the first screen and through the granulator they remain in the substantially whole condition and are easily separated from the glass as the cullet passes through the holes in the screen.

Basically, a bottle cap, metal ring or paper label which enters the glass breaker will exit the glass breaker as a bottle cap, metal ring and paper label with perhaps a change in shape but not a change in volume as happens to the glass that enters the breaker. Likewise, when this non-glass material enters the granulator it will not be granulated i.e. the volume is not reduced, as happens to the glass as the glass passes through the granulator. In some cases these non-glass articles are flattened and get larger as they pass through the granulator. Thus an unanticipated and unexpected benefit is achieved as a result of the features of both the breaker and the granulator.

Glass in the form of cullet which is free of these aforementioned non-glass articles which are considered contaminants has much more value and utility in the marketplace.

The invention disclosed and claimed herein has substantial advantages over any of the prior art with which applicant is familiar.

Particularly, the first machine breaks the glass using a rotating shaft with breaker bars attached thereto. The glass is shattered by impact with radially extending members of a rotating shaft and by causing the glass to impact a breaker plate within the breaking chamber. Even more particularly the glass breaker will economically and effectively shatter the glass into relatively small particles and retain the non-glass articles in the substantially whole condition. The third machine of the present invention, the glass granulator, granulates the cullet using at least one pair of synchronously counter-rotating rolls which, in the preferred embodiment, each has a plurality of granulating protrusions extending radially therefrom. The protrusions on each of the rolls, while the rolls are counter-rotating, interleave creating crushing or granulating zones wherein the glass cullet is granulated. The emerging particles of glass from the granulator are of a predetermined maximum size that will sieve through a screen with predetermined size holes.

The sieving or screening of the glass through the upper screen which is the second part of the process and the lower screen which is the fourth and final part of the process is where the contaminants are separated away from the glass cullet and out of the apparatus for disposal.

The glass cullet that is processed through the apparatus is of a predetermined maximum size to facilitate efficient separation from the aforementioned non-glass contaminants. The glass cullet emerging from the apparatus may be of such small particle size that the product resembles the texture of sand. The particle size of the glass emerging from the apparatus is determined by the adjustment of the granulator. Changes in the adjustment of the machine to create smaller product size i.e. sand like product or aggregate may be chosen to prepare the glass for alternate markets within the recycling industry, most of which require clean and contaminant free glass.

In addition, the same process and apparatus may be used to separate and recover glass from the end of a sort line belt as an alternative to landfilling this broken glass. This is especially important as landfills are being closed and the necessity to recover as much glass as possible from the waste stream becomes a reality.

DESCRIPTION OF THE PRIOR ART

In order to recycle container glass it is important to remove non-glass articles such as caps, rings, paper, metal, plastics, covers, lids, and other materials considered contaminants. The reason for the removal of these contaminants is to greatly enhance the value of glass in the marketplace. In addition to the removal of these contaminants it is also desirable to create specific glass product sizes for different markets and reduce the volume of glass, from the whole condition, for safe and efficient, transporting and storage of the glass end product.

The apparatus disclosed and claimed herein may be an aggregation of two different machines disclosed and claimed by the applicant hereof. The first is called a glass breaker and the second is called a glass granulator. Both of these machines are used to reduce the size of the particles of glass to prepare the glass for screening i.e. separation of glass particles and non-glass articles. Additionally, there is described a cullet screen/sieve which is appropriately positioned and oriented and mechanically agitated so as to move the cullet and size the cullet after the glass has passed through the glass breaker and/or the glass granulator.

The method and apparatus to remove contaminants from container glass as claimed herein is of a very distinct difference and improvement over the prior art inventions. The prior art machines have been developed which, because of the multi-purpose intent of the machine, are relatively complex, large and expensive. The rotors and the knives which are used are very specially configured so that they will reduce varieties of materials. When the machines need repair, such as the replacement of a rotor, the procedure appears to be complicated and time consuming. Thus the "down-time" is considerable. The machines described by the prior art have generally not found much acceptance for any and all of the above noted reasons.

There is no claim in any prior art that discloses an apparatus to reduce the volume of any material but still retain a part of the material in the substantially whole condition. All of the prior art inventions that remove non-glass articles from container glass do so by using a combination of mechanical, magnetic, manual, air operated or numerous other kinds of devices to remove the different types of contaminants. For instance to remove ferrous metal a magnet may be used, to remove aluminum caps an aspirator nozzle may be used, to remove paper labels a vacuum is used. In applicants invention a screen is used to remove aluminum, paper, metal and all other contaminants.

Any one of ordinary skill in the art at that time would have realized the advantages to increased production and a much smaller, simpler and less costly apparatus to process the glass and remove non-glass articles with a single method of screening for all contaminant removal. These prior art inventions would have been deemed obsolete and would never have been patented if anyone of ordinary skill in the art would have known of the method and apparatus the applicant discloses in this application.

No one of ordinary skill could have anticipated separating glass and non-glass articles with a simple screening process when all of the prior art that teaches the removal of these contaminants from glass, does so with completely and totally different, much more complicated and more costly, utilizing many more additional methods to remove non-glass articles than does the applicant's invention as disclosed in this application.

Some inventions related to the instant invention and disclosed in the following United States patents have been studied. Morgan et al, U.S. Pat. No. 3,151,814, Qualheim, U.S. Pat. No. 3,504,621, Taylor et al, U.S. Pat. No. 3,587,984, Luscombe, U.S. Pat. No. 3,655,138, and Anderson, U.S. Pat. No. 3,750,966. Essentially all of the patents are directed at to devices and/or machines or processes used to process glass items for the purpose of recycling. There are quite a few variations around the basic use of a rotating shaft having appendages extending around the circumference. Some of the patents define and describe complicated structures and some of them much more simple structures, all of them useful in the comminuting of glass objects. All of the patents with which the applicant is familiar, appear to be variations of rotors and of smashing, breaking, crushing, cutting, disintegrating, hammering vanes/breaker bars and the like. The invention disclosed and claimed herein as an apparatus for processing container glass, is very simple and performs a function which none of the above mentioned patents perform.

The prior art that is relevant to the applicant's invention is as follows: Waltert, U.S. Pat. No. 4,867,384 and Lech, U.S. Pat. No. 4,795,103. Both of these patents disclose a method and/or apparatus to remove non-glass articles from the glass for the purpose of recycling.

Waltert teaches the use of a system of multiple conveyors, multiple magnetic separators, vacuum systems, manual sorting stations, multiple mechanical separating stations, a crushing apparatus, inspection stations, two aspirator nozzles, multi-stage vibrating sieve, suction tubes, and several centrifugal air separators to remove the non-glass articles from the glass for the purpose of recycling. The obvious complexity of this process and the fact that the glass and non-glass articles are separated at many different places within the system through circulation and recirculation and at many different stations using many different methods is clear. The applicant's invention is so simple in comparison to the apparatus described above that anyone of ordinary skill in the art would have chosen the very basic method and apparatus disclosed and claimed by the applicant.

This same argument is also the case with the prior art from Lech who teaches the use of an impactor to pulverize the glass, a magnet to remove metal, a vacuum system to remove dust, paper, and plastic, a second magnet to remove additional metal, a vibrating screen, multiple conveyors, a vibrating chute, hoppers, feeders.

Both of these prior art inventions to remove non-glass articles from glass for the purpose of recycling are large, expensive and complex systems. The advantages of the present disclosed invention of the applicant is clear. Although very simple in theory and application the advantages are substantial. Break the bottle with a glass breaker, remove the smaller particles of glass with a pre-screen, squeeze the remaining glass and non-glass articles with a granulator and final screen the glass to remove contaminants. The glass is simply down sized and screened without all of the complex, expensive equipment required of both of these systems from the prior art as discussed above.

It is important to note that the simplicity and success of the applicant's invention is dependent upon the glass breakers ability, and the granulators ability, to not damage paper, rings, caps, lead foil etc; and to retain these non-glass articles in the substantially whole condition. No one of ordinary skill in the art would have thought of this method or apparatus from the prior art inventions as described above. The substantial advantages would have deemed these prior art inventions obsolete and the inventors would have changed their inventions to capitalize on this new and improved method and apparatus.

SUMMARY OF THE INVENTION

Basically the present invention in its most simple form or embodiment is directed to a method and apparatus used to process container glass for the purpose of recycling.

The apparatus consists of a glass breaker alone or a glass granulator alone or combinations of the two machines along with a screen/sieve and cullet mover mechanism to sort or size the glass particles for further reprocessing or for use as end product of the glass processing apparatus. The glass breaker breaks the glass containers using a rotating shaft with breaker bars attached thereto. The glass is shattered by impact with radially extending members of a rotating shaft and by causing the glass to impact a breaker plate within a breaking chamber. The granulator is used to process the glass to create glass particles of a predetermined maximum size, for the purpose of screening out caps, labels, paper, rings, etc. and to create the cullet or aggregate in a size that is desired and then subsequently sold to the market. Particularly, the granulator granulates the glass articles using at least one pair of synchronously counter-rotating rolls which, in the preferred embodiment, each has a plurality of granulating protrusions extending radially therefrom. The protrusions on each of the rolls, while the rolls are counter-rotating, interleave creating crushing or granulating zones wherein the glass objects, generally in the form of cullet, are crushed or comminuted. The emerging particles of glass may be so finely granulated (based upon the adjustment of the granulator) as a result of the action of the machine that the output product may resemble sand in texture and may be used in ways similar to the ways sand is in fact used. Particularly, the combination apparatus/machine first breaks up or shatters the glass articles in the glass breaker producing cullet. The cullet is sieved by the first sieving mechanism. That glass which is too large is moved along and fed into the glass granulator. Glass particles may again be sieved by a second sieve mechanism at the output of the granulator and those non-glass articles or contaminants are screened out and removed from the apparatus.

It is a primary object of the present invention to provide a machine for shattering glass containers comprising: a glass breaking chamber; means for introducing said glass containers into the breaking chamber, a rotary mechanism disposed, positioned and appropriately attached within the breaking chamber to shatter the glass introduced in to the chamber when the rotary mechanism is rotated at a predetermined rotary speed producing thereby comminuted glass particles. The breaking chamber has one side declined from vertical to direct the glass toward the rotary mechanism. The rotary mechanism is comprised of a horizontally directed shaft having means thereon for removably attaching a plurality of breaker bars. The breaker bars extend outwardly from the shaft, most preferably along radial lines in circumferentially and axially spaced relationship along a common axis of revolution. The breaker bars preferably have a substantially cylindrically configured body portion and tip ends, and have a length which allows for the unobstructed rotation of the bars within the breaking chamber. The length, in combination with the tip ends, is sufficient to produce the comminuted glass particles. There is also provided a means for rotating the rotary mechanism in a direction which moves the glass introduced into the breaking chamber toward the side declined from vertical. Typically the shaft is powered by an electric motor driving a set of proper pulleys via a "V" belt. Provision is made to be able to adjust the tension of the belt as is necessary, and means for switchably providing rotational power to said means for rotating.

It is another primary object of the present invention to provide the machine for shattering glass containers with a breaker plate removably mounted within the breaking chamber and onto the side declined from vertical and in spaced relationship with the breaker bar tip ends. There is also provided a means for removing the comminuted glass particles from the breaking chamber. Preferably, an opening is located at the bottom of the breaking chamber where the comminuted glass particles would otherwise collect, but instead, fall onto the upper screen/sieve mechanism.

Particularly the invention further relates to a relatively simple and easily maintained third machine, a glass granulator, which will economically and effectively granulate glass cullet into relatively fine particles which may then be used as a part of the composition of other products or otherwise sold after processing. Even more particularly, the machine granulates the glass objects using at least one pair of synchronously counter-rotating rolls which, in the preferred embodiment, each having a plurality of granulating protrusions extending radially therefrom. The protrusions on each of the rolls, while the rolls are counter-rotating, interleave creating crushing or granulating zones wherein the glass objects, generally in the form of cullet, are comminuted. The emerging particles of glass are so finely granulated as a result of the action of the machine that the output particle size will be small enough so that screening or sieving will separate the non-glass particles from the glass cullet.

It is an object of the present invention to provide a third machine for granulating glass cullet comprising: a glass granulating chamber; means for introducing the glass into the granulating chamber; a rotary mechanism disposed, positioned and appropriately attached within the chamber to granulate the glass introduced into the chamber when the rotary mechanism is rotated at a predetermined synchronous rotary speed producing thereby granulated glass particles. The rotary mechanism comprises, at least one pair of substantially horizontally directed, synchronously counter-rotatable rolls, means for adjusting a space between adjacent and opposed granulating surfaces of the at least one pair of rolls, the space creating a granulating zone wherein the glass cullet is granulated when the machine is operating. There is also provided a means for switchably providing rotational power for synchronously rotating the counter-rotatable rolls of the rotary mechanism in a direction which moves the glass articles introduced into the granulating chamber toward the granulating zones. The rolls may also have a means for removably attaching the granulating surfaces of the at least one pair of rolls and at least one of the rolls may be mounted compliantly (springs) so that the spacing between the rolls may change in the event of a tendency for jamming while the machine is operating. One or both of the rolls may be synchronously driven. There may also provide a means for removing the granulated glass particles from the granulating chamber. Preferably, an opening is located at the bottom of the granulating chamber where the granulated glass particles would otherwise collect, but instead, fall onto the lower screen/sieve of the apparatus.

A further object of the present invention to provide a third machine for granulating glass containers which preferably are in the form of glass cullet comprising: a glass granulating chamber; a means for introducing the glass articles into the granulating chamber, a rotary mechanism disposed, positioned and appropriately attached within the chamber to granulate the glass articles introduced into the chamber when the rotary mechanism is synchronously rotated at a predetermined rotary speed producing thereby granulated glass particles. The rotary mechanism comprises, at least one pair of substantially horizontally directed, synchronously counter-rotatable rolls each having a plurality of granulating protrusions protruding radially therefrom. The protrusions on each of said rolls have a geometric cross section and are located so that while the rolls are counter-rotating, the protrusions on one roll of the pair of rolls interleaves with the protrusions on another roll of the pair of rolls. There is also provided a means for adjusting a space between adjacent and opposed protrusions on one roll of the pair of rolls interleaving with the protrusions on another roll of the pair of rolls. One of the two rolls or both of them may be compliantly mounted using springs, for example. Also the pair of rolls may be synchronously driven by applying power to one or to both rolls. The means for adjusting and the interleaving protrusions, in combination, create granulating zones wherein the glass cullet is granulated when the machine is operating. The at least one pair of synchronously counter-rotatable rolls are substantially horizontally directed. There is also provided a means for switchably providing rotational power for rotating the rotary mechanism in a direction which moves the glass introduced into the granulating chamber toward the granulating zones. There may also be provided a means for removing the granulated glass particles from the granulating chamber. Preferably, an opening is located at the bottom of the granulating chamber where from the granulated glass particles will fall.

Another further object of the present invention to provide the third machine wherein said geometric cross section of each of said plurality of granulating protrusions is one selected from the group consisting of semi-circle, rectangle, trapezoid, half ellipse, parabola and triangle, said selected configuration substantially disposed in circumferentially and axially spaced relationship along a common axis of revolution.

Yet another further object of the present invention to provide the third machine wherein each of said at least one pair of synchronously counter-rotatable rolls further comprising means thereon for removably attaching at least one of said plurality of granulating protrusions.

Yet still another further object of the machine of the present invention is to provide a means for controlling and adjusting the rotary speed of the rotary mechanism.

A principle object of the present invention to provide an apparatus for processing glass containers comprising: means for shattering the glass articles thereby producing shattered glass particles. The particles are frequently collectively referred to as cullet. A first means for separating the particles of shattered glass which do not exceed a predetermined average volumetric dimension and thereby sieving-out small sized glass particles. The first means for separating further causing the oversize cullet produced by the means for shattering to be moved into a means for granulating the cullet. The means for granulating produces glass particles having a maximum predetermined volumetric dimension that allows all the glass to pass through the screen/sieve with predetermined sized holes.

Another principle object of the present invention to provide the apparatus for processing glass containers further comprising a second means for separating glass particles produced by the granulator and sieving the glass particles away from the non-glass articles.

These and further objects of the present invention will become apparent to those skilled in the art after a study of the present disclosure of the invention and with reference to the accompanying drawings which are a part hereof, wherein like numerals refer to like parts throughout, and in which:

BRIEF DESCRIPTION OF THE DRAWINGS

FIG. 3 is an exploded view of the breaking chamber showing the principle elements which are associated with the rotary mechanism to illustrate a means for mounting and locating the mechanism within the breaking chamber and illustrating the mounting of the breaker bars on the shaft.

FIG. 7 is a side view drawing of the granulator showing the granulator rolls, drive motor, rotary mechanism, bearings, sprockets, chains, and chain tensioner and other details.

DESCRIPTION OF THE PREFERRED EMBODIMENTS

Figure 2:
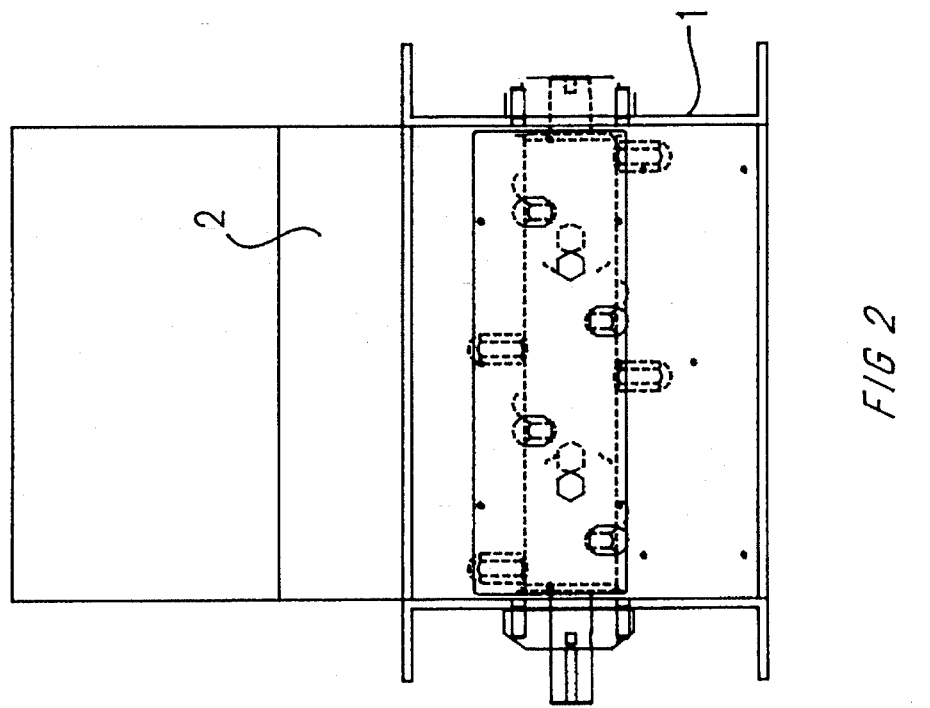
FIGS. 1 and 2 are side and end views of the glass breaker assembly and hopper illustrating the direction of glass containers as they go into the hopper and down the incline into the breaking chamber. Also shown are the motor and drive pulleys, belts and the rotary mechanism that impact breaks the glass.
Figure 1:
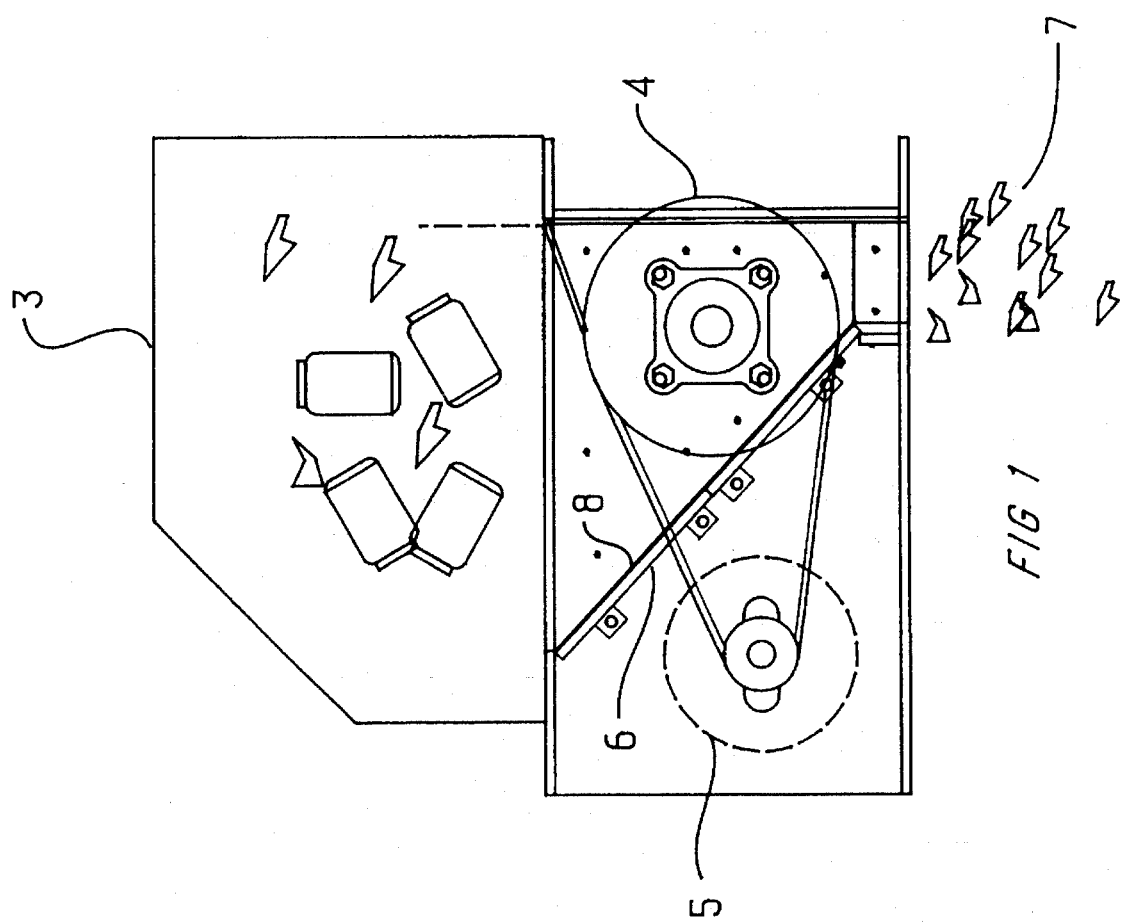
Figure 4:
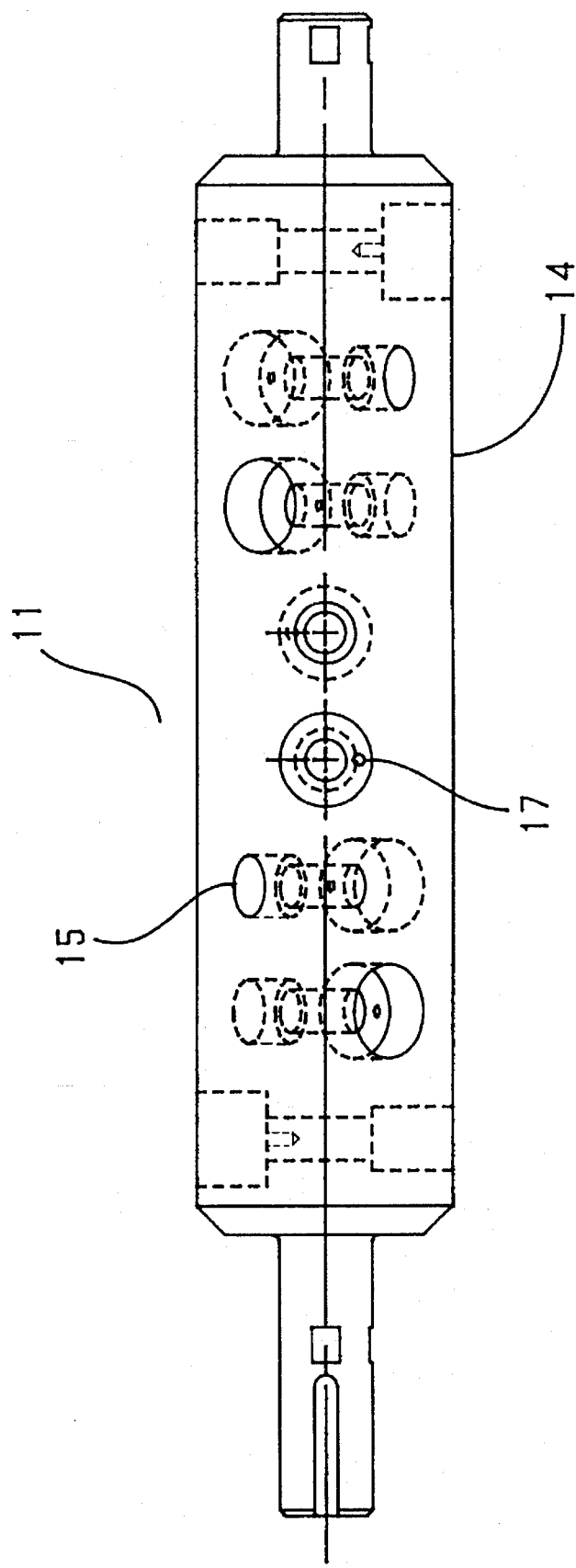
FIG. 4 is a detail drawing of the glass breaker main shaft.
Figure 6:
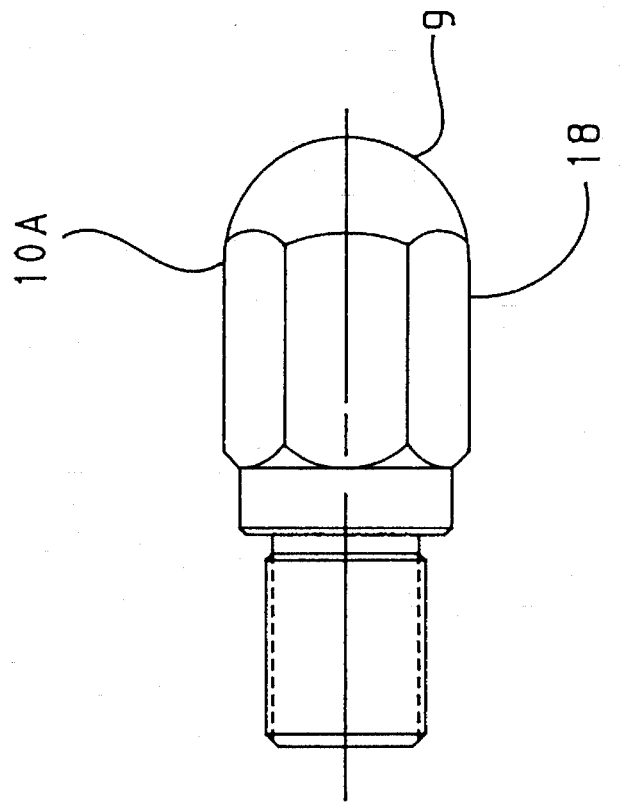
FIGS. 5 and 6 are drawing of two similar breaker bars as used in the glass breaker.
Figure 5:
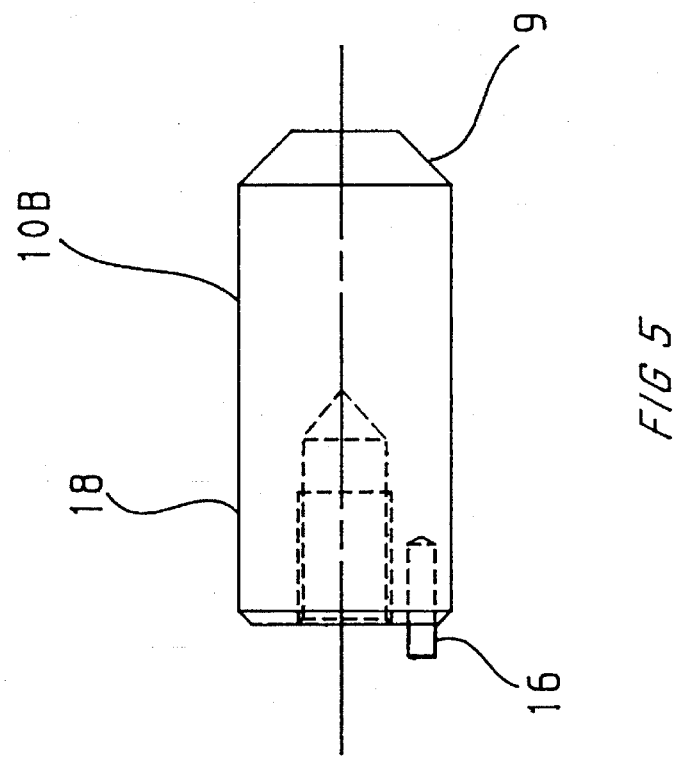

For the sake of brevity, clarity, and simplicity I shall not describe in detail those familiar parts such as gears, bearings, "V" pulleys, "V" belts, electric motors and the control of the speed of such motors, types of bolts and nuts which may be used in connection with the assembly of parts of the apparatus/machine disclosed herein. These elements or components are well known by one of ordinary skill in the machine manufacturing and design fields. There would be many ways in which components could be assembled to realize the functions and the advantages that are a part of the apparatus for processing glass cullet which is disclosed and claimed herein. It is also understood that, because the device may be scaled to provide for smaller or larger apparatus capable of handling smaller or larger volumes of glass to be processed, the dimensions of the apparatus are not fixed. However, the members have dimensions all of which are related one to the other so that upon assembly of the members to obtain the apparatus, properly sized spaces and volumes and apertures and glass flow paths are defined.

The apparatus of the present invention, an apparatus for the processing of glass containers to remove non-glass contaminants, in the preferred embodiment is comprised of both the first 1 and the third 20 machines assembled in a manner so as to use the output of the first machine—breaker—as the input of the granulator. There would also be incorporated a first means for sieving and moving 39 the output of the breaker 1 to the input of the granulator 20. There may also be a second means for sieving and moving 40 the output of the granulator 20 and subsequently to a place for storage and shipping. The purpose of second means for sieving, 40, is to take out all of the contaminants which are not granulated into small glass particles, i.e. that material which is non-glass. The non-glass articles are kept separate from the "clean" glass cullet which is the intended product of apparatus 38. A chute may be provided to take the output of the breaker 1, which is of a size to fall through the upper screen, and cause the glass cullet to be deposited onto the product conveyor along with the glass that falls through the lower and final screen from the granulator.

The construction of the first machine/apparatus 1 and/or the method used to process glass items for the purpose of recycling will be described with reference to FIGS. 1–6 collectively. The first machine 1 is substantially comprised of a glass breaking chamber 2; a means for introducing glass articles into the breaking chamber 2, such as a hopper 3, a rotary mechanism 4 disposed, positioned and appropriately attached within the breaking chamber 2 to shatter glass articles introduced into chamber 2 when the rotary mechanism 4 is rotated at a predetermined rotary speed producing comminuted glass particles; and means for switchably providing rotational power, typically an electric motor 5 controlled by a switch which may also have speed control features, for rotating the rotary mechanism 4 in a direction which moves the glass articles introduced into the breaking chamber 2 toward a side 6 of chamber 2 which is declined from vertical. There is also provided a means for removing the comminuted glass particles from the breaking chamber 2. Preferably, an opening 7 is located at the bottom of the breaking chamber 2 where the comminuted glass particles would otherwise collect.

The declined side 6 of breaking chamber 2 preferably has mounted thereon a breaker plate 8 which may be of a hardened material which better resists the wear which takes place when machine 1 is in operation and is breaking the glass articles, such as bottles, into comminuted particles of glass. The plate 8 is positioned relative to tip ends 9 of breaker bars 10 so that the glass articles being shattered by the tip ends 9 alone or in combination with the breaker plate 8 are shattered into particles which have an acceptable or desirable average size. The spacing or the spaced relationship of the breaker bar tip ends 9 and the breaker plate 8 along with the rotational speed of the rotary mechanism 4, in combination, effect the average particle size of the comminuted glass.

The rotary mechanism 4 is basically made up of a shaft 11 the ends of which are adapted to mate with bearing assemblies 12A and 12B and with shaft pulley 13. The shaft body portion 14 has holes 15 positioned axially, and circumferentially along the shaft body portion 14 with the centerlines of holes 15 on radial lines of shaft 11. A plurality of breaker bars 10 are securely affixed to shaft body portion 14, in the embodiment shown, through the use of conventional and known machine bolts, nuts and washers. To provide for more ease in the assembly of breaker bars 10 onto shaft portion 14, the bars 10 have a pin 16 located at the bottom end which fits into hole 17 at the bottom of hole 15. This arrangement permits the mounting of bars 10 onto shaft 11 without the need to hold bars 10 from turning when the bolt used to secure the bar 10 is tightened. Obviously, the pin 16 and the hole 17 are not essential to the operation of machine 1.

The breaker bars 10 as illustrated in the various drawing figures, have a substantially cylindrically configured body portion 18 and tip ends 9. Breaker bars 10 having a length which allows for the unobstructed rotation of the bar tip ends 9 within breaking chamber 2 and which length, in combination with tip ends 9 defines a space between the tip ends 9 and the breaker plate 8. In the preferred embodiment shown, the tip ends 9 have a chamfer or may have a cylindrical radius or other shape. It is noted that the configuration of the tip ends 9 may vary in any number of ways; and the method of attachment of the breaker bars 10 to the shaft body 14 may also vary. For example the breaker bars 10 may screw into the shaft body 14 instead of using bolts as is shown.

The construction of the glass granulator or third machine 20 used to process glass items for the purpose of recycling will be described with reference to FIGS. 7–9 collectively. Machine 20 is substantially comprised of a glass granulating chamber 21; a rotary mechanism 22 disposed, positioned and appropriately attached within the granulating chamber 21 to granulate glass articles introduced into chamber 21 when the rotary mechanism 22 is rotated at a predetermined rotary speed producing granulated glass particles; and means 23 for switchably providing synchronous rotational power, typically an electric motor 24 controlled by a switch which may also have speed control features, for counter-rotating rolls 25 and 26 of the rotary mechanism 22 in a direction which moves the glass articles introduced into the granulating chamber 21 toward a granulating zone or space 27 of chamber 21. There is also provided a means for removing the granulated glass particles from the granulating chamber 21. Preferably, an opening 28 is located at the bottom of the granulating chamber 21 where the granulated glass particles would otherwise collect.

The granulating chamber 21 preferably has contained therein plates such as 29A and 29B which may be of a hardened material to better resist the wear which takes place when machine 20 is in operation and is granulating the glass articles. These plates 29A and 29B aid in directing the glass cullet toward the rotary mechanism 22.

The rotary mechanism 22 is basically made up of at least one pair of synchronously counter-rotatable rolls 25 and 26 the ends of which are adapted to mate with bearing assemblies 30 and 31. The bearing assemblies of either one or both of counter-rotatable rolls 25 and 26 are mounted so that the space 27 between the surfaces 25A and 26A is adjustable. The bearing assemblies may also be mounted so that there is a means for compliance provided by, for example, either compression or tension springs. In the event a solid object is directed into granulating zone 27, the width of space 27 may increase to let the object through. Another method for accommodating the entry of a non-breakable article into zone 27 is to provide a torque limited clutch assembly or hydraulic power mechanism and means 24 for switchably providing rotational power.

The means 24 for switchably providing rotational power is comprised of: sprockets 32A and 32B, mounted on shafts 33 and 34, which transmits the synchronous rotational power to the rolls 25 and 26, the motor 24 and the motor controls. The chain tension may be adjusted using the tension adjuster 35 which moves the chain closer to or further from rotary mechanism 22.

Figure 8:
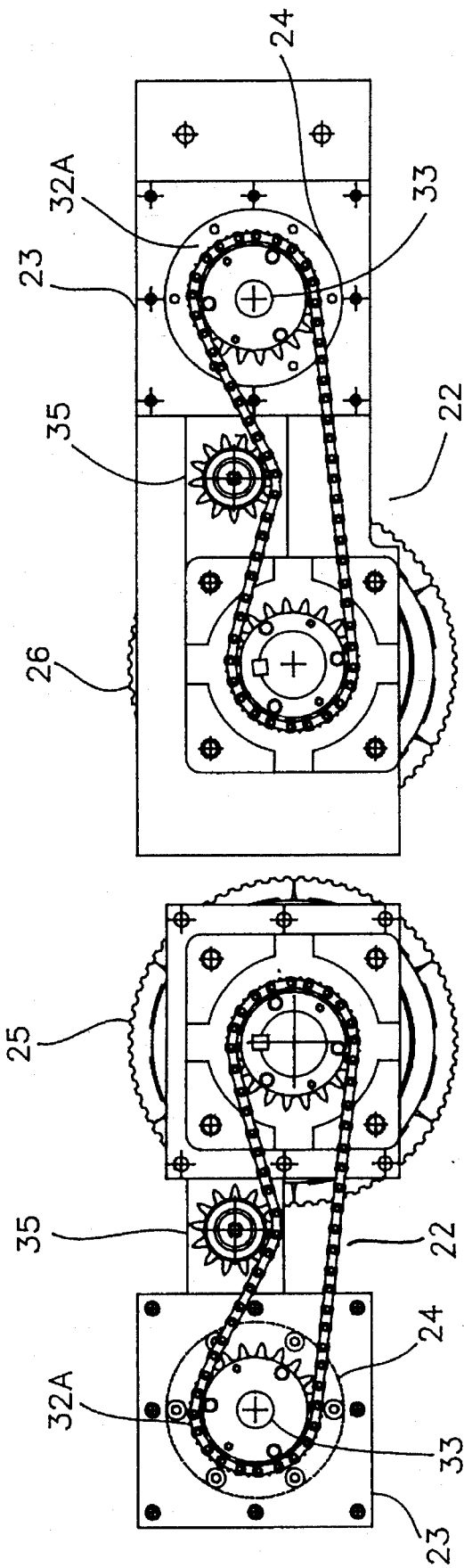
FIGS. 8 & 9 are drawings of the granulator rolls illustrating the interleave of the two outside protrusion surfaces, the granulating zone and the relative location of the rolls to one another. Also shown is one example of how the protrusions may be attached to the roll.
Figure 9:
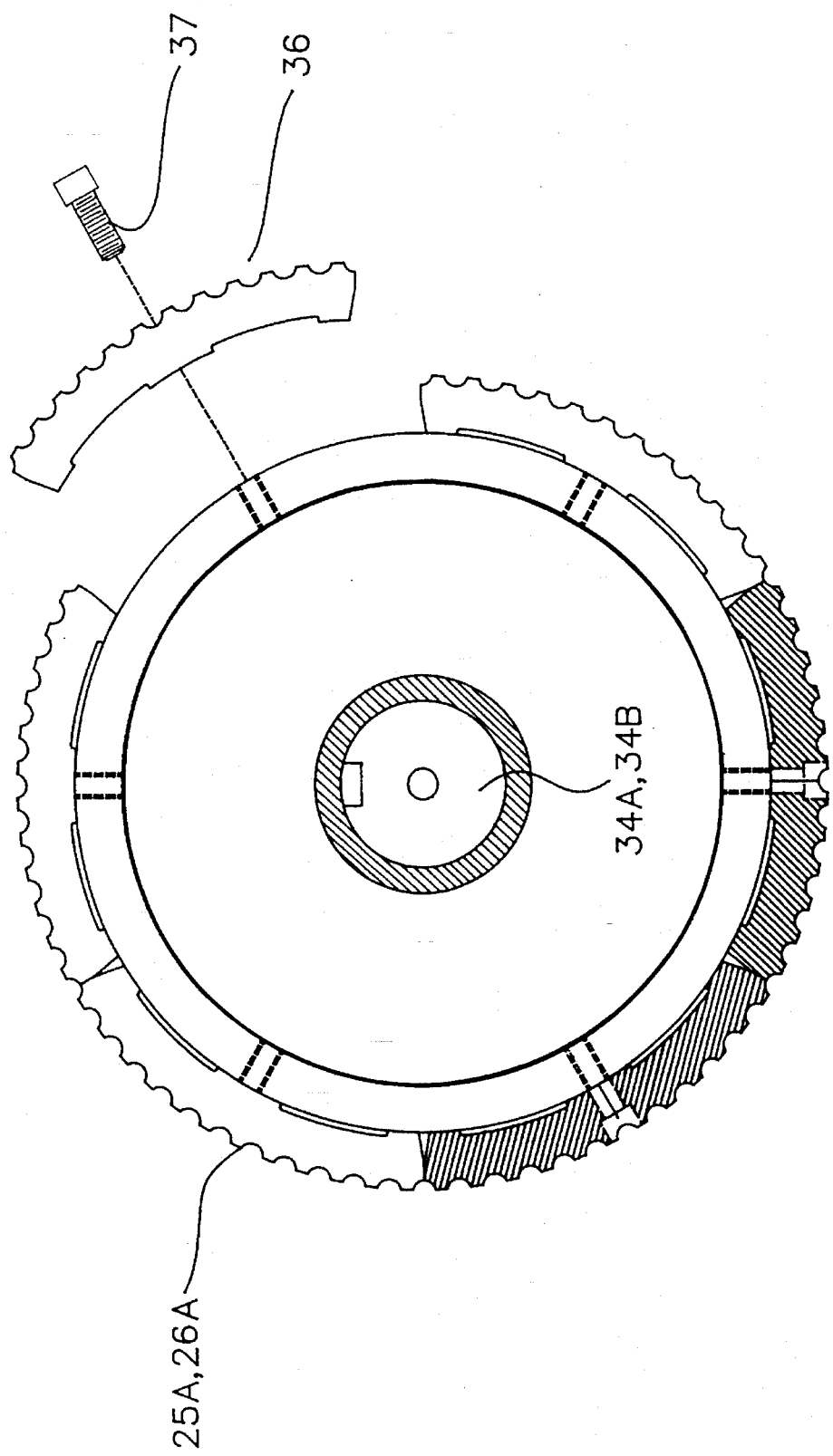

FIGS. 8 and 9 show the means for replacing protrusions 36 using machine bolts 37.

Clearly, the use of a plurality of protrusions 36 whether they have a cross section which is semi-circular, rectangular, trapezoid, elliptical, parabolical, triangular or whatever, increases the size of the granulating zone 27.

"Roll faces" 36 which comprise the granulating surface may then be placed around the outer surface of the roll and rigidly attached to constitute a means for removably attaching the granulating surfaces 25A and 26A.

While the preferred embodiments of the invention have means for driving each roll 25 and 26, it should be understood that it may be necessary to provide rotational power to only one of the rolls of mechanism 22. The introduction of glass cullet into the granulating zone 27 will cause the unpowered roll to counter-rotate. It is also noted that rolls 25 and 26, because of the interleaving of the protrusions 36 will synchronously counter-rotate even if only one of the rolls is driven.

It is thought that the first and third machine 1 and 20 respectively, as embodiments of the present invention, and many of the attendant advantages will be understood from the foregoing description and it will be apparent that various changes may be made in the form, construction and arrangement of the parts thereof without departing from the spirit and scope of the invention of sacrificing all of its material advantages, the form hereinbefore described being merely a preferred or exemplary embodiment thereof.

Figure 10:
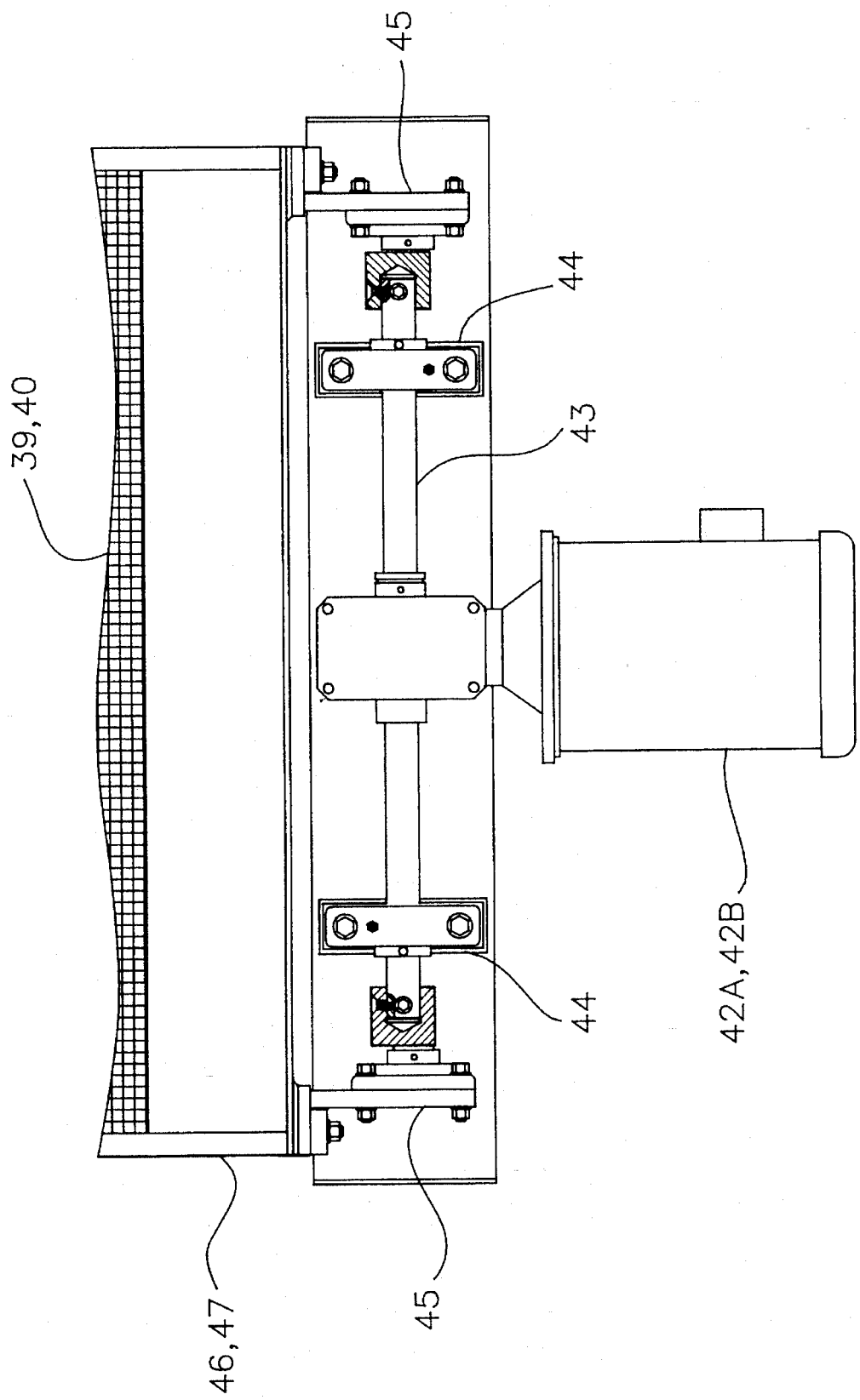
FIG. 10 illustrates the sieve drive mechanism.
Figure 12:
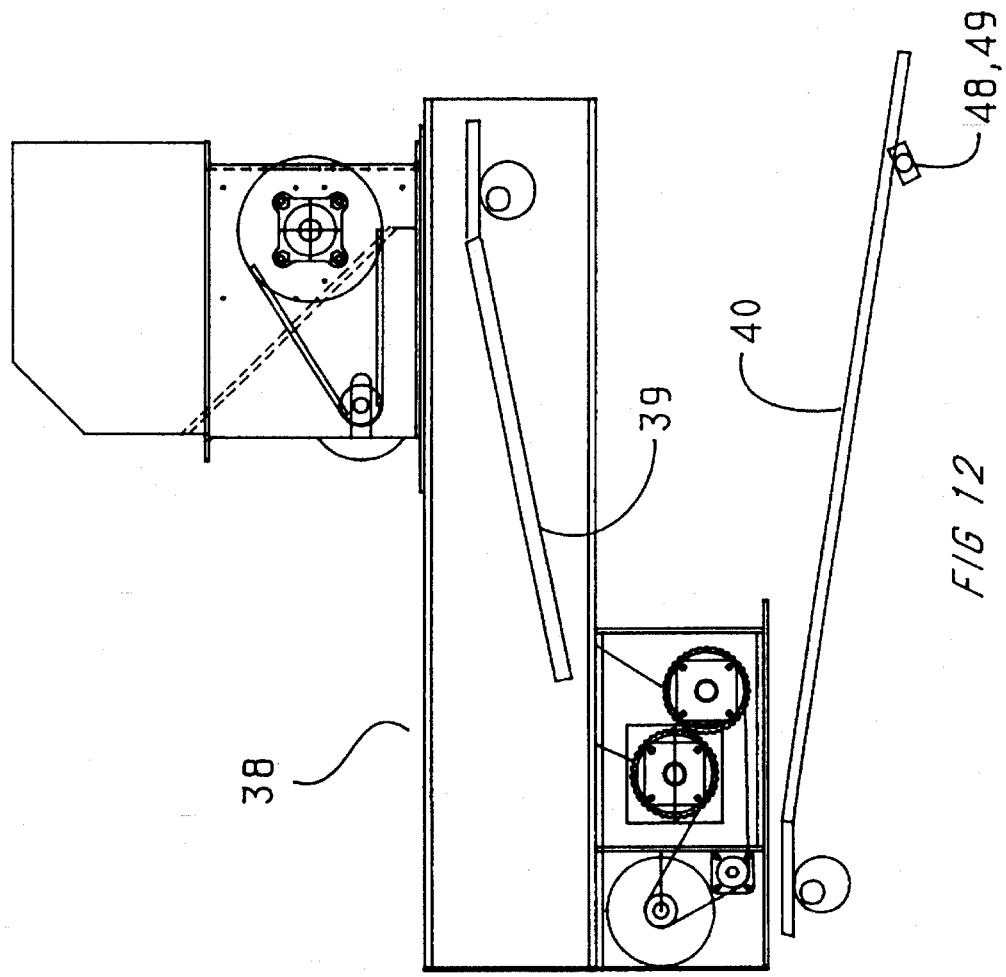
FIGS. 11 and 12 are drawings of the complete apparatus showing the relative locations of the various components. The views are side and end views.
Figure 11:
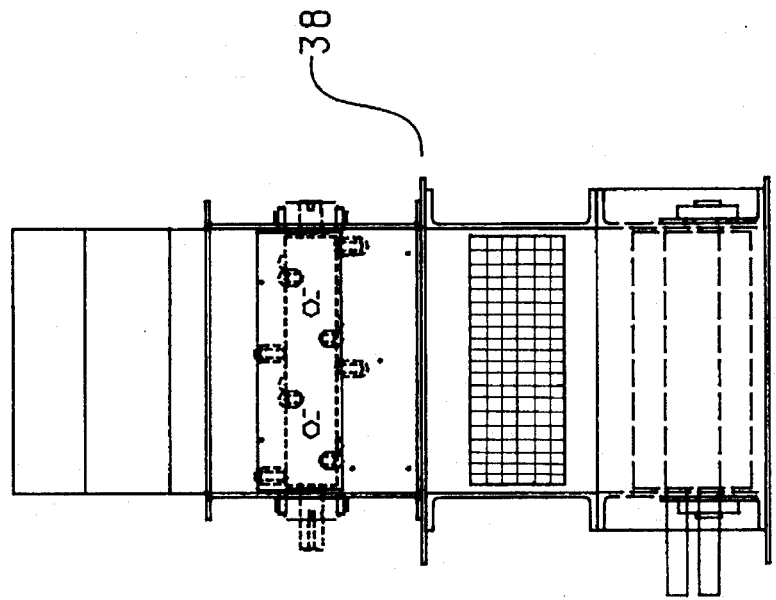

Reference is now made to the embodiments in FIGS. 10, 11 and 12. The apparatus 38 could be comprised of both the first machine and the third machines, 1 and 20 respectively, assembled in a manner so as to use the output of the first machine 1—glass breaker—as the input of the granulator 20. There would also be incorporated a first means for sieving and moving 39 the output of the breaker 1 to the input of the granulator 20. There may also be a second means for sieving and moving 40 the output of the granulator 20 to a place for storage and shipping. The purpose of second means for sieving and moving, 40, is to take out material which does not get granulated into small glass particles which are the non-glass articles or contaminants. The non-glass is kept separate from the glass granules which is the intended output of apparatus 38.

First means 39 and second means 40 for sieving or separating particles of shattered glass are substantially the same in operation and in construction. In describing the operation of and the elements of both first and second means 39 and 40 the first means 39 will be described and the second means will be assumed identical in operational character.

First means for separating and moving 39 comprises a means for moving which is a motor and gear reduction assembly 42A the output of which drives or rotates shaker shaft 43. Shaft 43, at each end, goes through an offset bearing 44 which is secured in blocks 45. Blocks are attached to first sieve frame 46. When first means for moving 39 is actuated the rotation of shaft 43 within offset bearing 44 cause the blocks 45 and consequently frame 46 to move in a plane perpendicular to shaft 43 in all directions by an amount equal to the distance between the centerline of shaft 43 and the center of offset bearings 44. This motion causes cullet which is on first screen/sieve 39 to move along the sieve 39 toward the input of the granulator 20. (With regard to means 40, the glass granules are sieved through the screen to output 41 and non-glass particles are moved off of the end of the screen 40 for disposal). Idlers 48 at the output end of first means 39 ride in idler blocks 49 which are preferably attached to the frame of apparatus 38. Side rails 50 have mounted thereon in proper space relation, glass breaker 1, first means 39, glass granulator 20 and second means for sieving and moving 40. The output ends of both the first and second means 39 and 40 are associated with apparatus 30 by use of idlers 48 and idler blocks 49 to attach and provide movements of the lower end of both screens 39 and 40.

In both first and second means for sieving, 39 and 40 respectively, screens 51 and 52 may be interchanged with screens/sieves having different hole sizes. Additionally, there could be a sheet placed in frames 46 and/or 47 which would prevent the sieving action. Also, more than one screen could be placed one on top of the other into either or both frames 46 and 47 in order to obtain a desired type of granules as the output of the apparatus 38. Thus it is not the intent to describe the details of the mechanical construction of the apparatus but to describe and define the manner in which the various elements of the apparatus interact to achieve the advantageous function of processing glass articles for the purpose of reusing the glass to advantage rather than discarding it.

It is understood that the machines and the apparatus, all of which are for the processing of glass containers, as illustrated and described herein may have different dimensions and variations of the illustrated basic geometry.

I claim:

1. A method for processing glass containers provided with non-glass articles, such as caps, labels, rings and lead foil, so as to facilitate recycling of the glass containers, comprising the steps of:

breaking the glass containers into glass pieces without substantially changing the volumetric size of the non-glass articles;

feeding the glass pieces and the non-glass articles onto a first screen having holes of a first predetermined size;

sieving or separating out small glass pieces which fall through the first screen, whereby the small glass pieces are separated from large glass pieces and the non-glass articles which remain on the first screen;

feeding the large glass pieces and the non-glass articles remaining on the first screen into a squeezing mechanism;

breaking the large glass pieces, which are fed into the squeezing mechanism, into smaller glass pieces having a predetermined maximum size without fragmenting the non-glass articles;

feeding the smaller glass pieces and the non-glass articles onto a second screen having holes of a second predetermined size;

sieving or separating out the smaller glass pieces which fall through the second screen, whereby the smaller glass pieces are separated from the non-glass articles which remain on the second screen;

transporting the non-glass articles, which remain on the second screen, from an end of the second screen for disposal;

recovering the small and smaller glass pieces from the first and second screens, respectively, after the small and smaller glass pieces fall through the first and second screens, respectively, due to gravity; and transporting the small and smaller glass pieces away for recycling, for an alternate end use, or for remelt into new glass containers.

2. The method of claim 1, further comprising oscillating the first and second screens so as to facilitate the sieving or separating steps.

3. The method of claim 2, further comprising the step of adjusting the squeezing mechanism so as to selectively determine the predetermined maximum size of the smaller pieces.

4. The method of claim 3, wherein said adjusting step is performed such that the squeezing machine granulates the large glass pieces into sand-like glass particles without fragmenting the non-glass articles.

5. The method of claim 4, further comprising feeding broken glass pieces onto the first screen from an end of a sort line.

6. Apparatus for processing glass containers provided with non-glass articles, such as caps, labels, rings and lead foil, so as to facilitate recycling of the glass containers, comprising:

first breaking means for breaking the glass containers into glass pieces while substantially maintaining the volumetric size of the non-glass articles;

first sieving means, including a first screen which is provided with holes of a first predetermined size and which is sized and shaped so as to receive the glass pieces and the non-glass articles, for sieving or separating out small glass pieces which fall through said first screen, whereby the small glass pieces are separated from large glass pieces and the non-glass articles which remain on said first screen;

second breaking means, including a squeezing mechanism positioned so as to receive the large glass pieces and the non-glass articles from said first sieving means, for breaking the large glass pieces into smaller glass pieces having a predetermined maximum size while maintaining the non-glass articles in a substantially whole condition;

second sieving means, including a second screen which is provided with holes of a second predetermined size and which is sized and shaped so as to receive the smaller glass pieces and the non-glass articles, for sieving or separating out the smaller glass pieces which fall through said second screen, whereby the smaller glass pieces are separated from the non-glass articles which remain on said second screen;

first transporting means for transporting the non-glass articles, which remain on said second screen, from one end of said second screen for disposal;

recovering means for recovering the small and smaller glass pieces from said first and second screens, respectively, after the small and smaller glass pieces fall through said first and second screens, respectively, due to gravity; and second transporting means for transporting the small and smaller glass pieces away for recycling, for an alternate end use, or for remelt into new glass containers.

7. The apparatus of claim 6, wherein said first breaking means includes a first chamber, having an inlet and an outlet; a rotary shaft rotatably mounted within said first chamber; and a plurality of breaker bars mounted on said rotary shaft for conjoint rotation therewith.

8. The apparatus of claim 7, wherein said second breaking means includes a second chamber, having an inlet and an outlet; and a pair synchronously counter-rotating rolls rotatably mounted within said second chamber.

9. The apparatus of claim 8, wherein one end of said first screen is positioned below said outlet of said first breaking means, whereby the glass pieces and the non-glass articles are tied onto said one end of said first screen from said outlet of said first breaking means; and wherein an opposite end of said screen is positioned above said inlet of said second breaking means, whereby the large glass pieces and the non-glass articles are fed into said inlet of said second breaking means from said opposite end of said first screen.

10. The apparatus of claim 9, wherein an opposite end of said second screen is positioned below said outlet of said second breaking means, whereby the smaller glass pieces and the non-glass articles are fed onto said opposite end of said second screen from said outlet of said second breaking means.

11. The apparatus of claim 10, wherein said rolls are sized and shaped so as to flatten at least some of the non-glass articles.

12. The apparatus of claim 11, wherein each of said rolls includes teeth formed on a surface thereof.

13. The apparatus of claim 12, wherein said rolls cooperate to form a space therebetween, said space widening when the non-glass articles pass therethrough to thereby maintain the non-glass articles in a substantially whole condition, and said space remaining substantially constant when the large glass pieces pass therethrough to thereby allow said rolls to granulate the large glass pieces.

14. The apparatus of claim 13, wherein said second breaking means further includes adjusting means for adjusting said space, whereby the predetermined maximum size of the smaller glass pieces is selectively determined.

15. The apparatus of claim 14, wherein said first breaking means further includes a breaker plate mounted on an inclined wall of said first chamber, whereby said breaker bars cause at least some of the glass containers to impact upon said breaker plate with a force sufficient to break them into glass pieces.

16. The apparatus of claim 15, wherein said one end of said first screen is positioned at an elevation which is higher than the elevation of said opposite end of said first screen; and wherein said first sieving means includes first oscillating means for oscillating said first screen, whereby the small glass pieces, which fall though said first screen, are separated from the large glass pieces and the non-glass articles, which remain on said first screen, as the glass pieces and the non-glass pieces are caused to move from said one end of said first screen toward said opposite end of said first screen in response to the oscillation of said first screen.

17. The apparatus of claim 16, wherein said one end of said second screen is positioned at an elevation which is lower than the elevation of said opposite end of said second screen; and wherein said second sieving means includes second oscillating means for oscillating said second screen, whereby the smaller glass pieces, which fall through said second screen, are separated from the non-glass articles, which remain on said second screen, as the smaller glass pieces and the non-glass pieces are caused to move from said opposite end of said second screen toward said one end of said second screen in response to the oscillation of said second screen.

18. The apparatus of claim 17, wherein said breaker bars are removably mounted on said rotary shaft.

19. The apparatus of claim 18, wherein each of said surfaces of said rolls is defined by a plurality of discrete members removably and circumferentially mounted on a corresponding one of said rolls.

20. The apparatus of claim 19, wherein said first predetermined size is larger than said second predetermined size, whereby said holes of said first screen are larger than said holes of said second screen.

* * * * *